United States Patent [19]

Durrieu

[11] Patent Number: 5,145,580
[45] Date of Patent: Sep. 8, 1992

[54] APPARATUS COMPRISING A TUBE BUNDLE MOUNTED IN A SHELL AND UNDERGOING DIFFERENTIAL THERMAL EXPANSION THEREWITH

[75] Inventor: Marc Durrieu, Sainte Adresse, France

[73] Assignee: Total Raffinage Distribution S.A, Levallois Perret Cedex, France

[21] Appl. No.: 740,810

[22] Filed: Aug. 6, 1991

[30] Foreign Application Priority Data

Aug. 7, 1990 [FR] France .................. 90 10070

[51] Int. Cl.$^5$ .............................................. B01D 63/00
[52] U.S. Cl. ........................... 210/321.61; 210/321.79; 210/321.8; 210/321.89; 210/323.2; 210/354; 210/450
[58] Field of Search ...................... 210/321.88, 321.89, 210/321.8, 321.79, 321.87, 323.2, 354, 450, 456, 500.25, 321.61

[56] References Cited

U.S. PATENT DOCUMENTS

| | | | |
|---|---|---|---|
| 2,042,564 | 6/1936 | Sweetland | 210/120 |
| 3,977,967 | 8/1976 | Trulson et al. | 210/321.89 |
| 4,277,338 | 7/1981 | Hoagland | 210/450 |
| 4,316,802 | 2/1982 | Howell | 210/95 |
| 4,461,707 | 7/1984 | Thayer et al. | 210/323.2 |
| 4,640,774 | 2/1987 | Garcera et al. | 210/323.2 |
| 5,074,989 | 12/1991 | Sigaud et al. | 210/109 |

FOREIGN PATENT DOCUMENTS 1059266 6/1952 France .
1191640 2/1958 France .

Primary Examiner—Robert A. Dawson
Assistant Examiner—Ana M. Fortuna
Attorney, Agent, or Firm—A. Thomas S. Safford

[57] ABSTRACT

The invention relates to an apparatus which comprises a plurality of tubes made of a first material, which tubes are mounted inside a cylindrical body or shell made of a second material, which second material undergoes differential thermal expansion in relation to the first material of the tubes. The tubes are rigidly secured by their ends to two end members, at least one of which is a floating member due to the fact that it is connected to the shell by means of a flexible ring gasket. The flexible ring-type gasket has inner and outer edges which are clamped to the floating member and to the shell, respectively. The inventive apparatus is useful, for example, in the ultra filtration separation of fine catalyst particles which are in suspension in a hydrocarbon feedstock which feedstock comes from a catalytic cracking unit.

15 Claims, 1 Drawing Sheet

APPARATUS COMPRISING A TUBE BUNDLE MOUNTED IN A SHELL AND UNDERGOING DIFFERENTIAL THERMAL EXPANSION THEREWITH

FIELD OF THE INVENTION

The present invention relates to an apparatus comprising a tube bundle mounted in a shell which tube bundle and shell undergo differential thermal expansion relative to one another.

BACKGROUND OF THE INVENTION

Such an apparatus is useful in several technical fields, for example, when separating fine catalyst particles which are in suspension in a hydrocarbon feedstock, which feedstock comes from a catalytic cracking unit.

From French patent No. 2,587,629 (which corresponds to U.S. application Ser. No. 639,756, now U.S. Pat. No. 5,074,989, incorporated herein by reference), a separating apparatus of this type is known which comprises a bundle of cylindrical tubes or barrier tubes made of a mineral substance, for example, alumina or carbon, which are internally coated with one or more coats of metallic oxides. These tubes are mounted in parallel in a metallic unit known as a module, which module comprises a cylindrical shell that is closed at its ends by end walls. The latter are perforated with orifices into which the ends of the tubes are set with gaskets made of a fluoroelastomeric synthetic rubber, such as Viton ®, produced by E.I. du Pont de Nemours and Co., or of graphite, which gaskets provide a tight seal with the tubes at the orifices in the shell's end walls. A dished bottom having a pipe manifold and connecting flanges connects the lower end of the shell to circulation pipes.

Between the interior of the barriers and the exterior, a pressure differential is created which may be of the order of about ten bars. The hydrocarbon or concentrate feedstock passes into the module through said inlet piping, circulates inside the barriers, and then exits through outlet piping identical with the inlet piping. Due to the pressure differential, a sizable fraction of the hydrocarbon feedstock, known as the filtrate, traverses the barriers from the interior towards the exterior.

However, this known apparatus has a serious drawback, namely, the differential expansion which results from the difference in the coefficients of expansion between the component materials of the module and of the barriers, that is, the steel and the carbon. To absorb this expansion, the prior art makes provision for the variations in length to be absorbed by the gaskets mounted on each barrier. However, in the presence of fluids such as a suspension of solid catalyst particle fines in a liquid, the barriers cake at the level of the gaskets. Therefore, in the course of a shutdown/startup procedure of the microfiltration apparatus, and hence in the presence of considerable temperature variations, the barriers may break down, and the apparatus then no longer fulfills its function of retaining the catalyst particle fines.

This drawback is also encountered in all apparatus which generally comprise a tube bundle made of a first material that is mounted in a cylindrical body which body is made of a second material, and which materials undergo differential expansion relative to one other.

BRIEF DESCRIPTION OF THE INVENTION

The present invention seeks to eliminate this drawback, and to this end it has as a preferred embodiment an apparatus of the type having a plurality of tubes made of a first material which are mounted inside a cylindrical body or shell made of a second material which undergoes differential expansion relative to the material of the tubes, but where the inventive apparatus has tubes that are rigidly secured by their ends to two members, at least one member of which is a floating member due to the fact that it is connected to the shell by a flexible ring gasket whose inner and outer edges are clamped to the floating member and to the shell, respectively.

The other member may be connected to the shell either by means of a second flexible ring gasket fastened in the same manner, or by means of a dimensionally stable disk.

However it may be utilized, the invention solves the problem of differential expansion between the tubes and the shell, since in the inventive apparatus, these components are no longer in direct contact with one other, as they were in the aforesaid prior art, but are instead interconnected by at least one flexible gasket which allows them to expand independently of one other.

BRIEF DESCRIPTION OF THE DRAWINGS

In this specification and in the accompanying drawings, I have shown and described preferred embodiments of my invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS OF THE INVENTION

The description of the apparatus will be based on the case of the separation of fine catalyst particles from a hydrocarbon feedstock where it finds particularly unique and effective application; however, in the broader aspects of this invention it is applicable to any apparatus comprising tubes mounted in a shell, wherein the tubes and shell undergo differential expansion.

Figure 1:
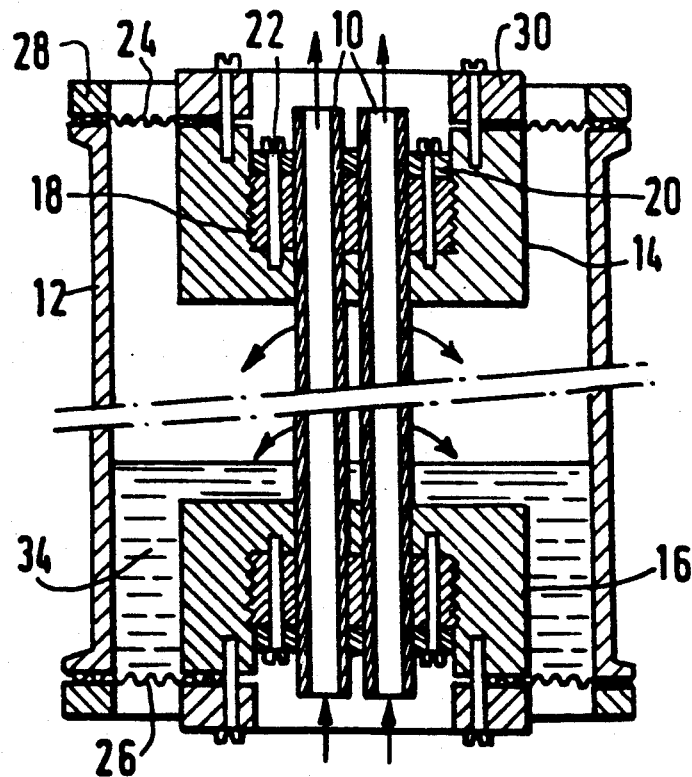
FIG. 1 is a sectional view of a filtration module.
Figure 2:
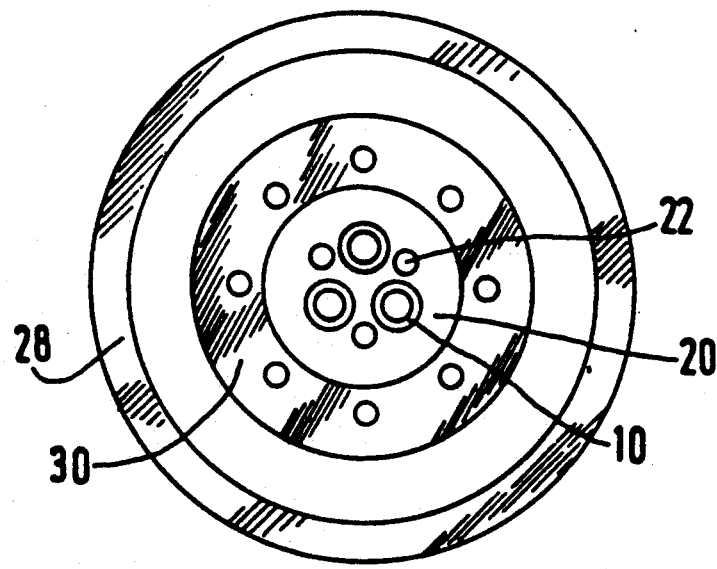
FIG. 2 is a top view of FIG. 1.

With reference to FIGS. 1 and 2, the filtration module comprises a plurality of tubes or mineral barriers 10 mounted in parallel inside a shell 12. Dished bottoms (not shown) connect the shell to inlet and outlet piping (not shown).

In accordance with the invention, the barriers 10 are rigidly secured by their ends in two floating members 14 and 16 which have the general shape of a disk or hollow cup. The bottom of the floating members are traversed by the tubes, and the latter are held by a packing material 18, such as a refractory cement, which is poured cold into the floating members and which is capable of hardening. The packing material is compacted by means of a cover disk 20 fastened with bolts 22. The ends of the tubes may project above the cover disk 20.

The floating members are connected to the shell 12 by means of flexible ring gaskets 24 and 26 whose inner and outer edges are clamped to the floating members and to the shell by means of collars 28 and 30.

The barriers 10 thus are no longer in contact with the shell and therefore are no longer ruptured by differential expansion.

Figure 3:
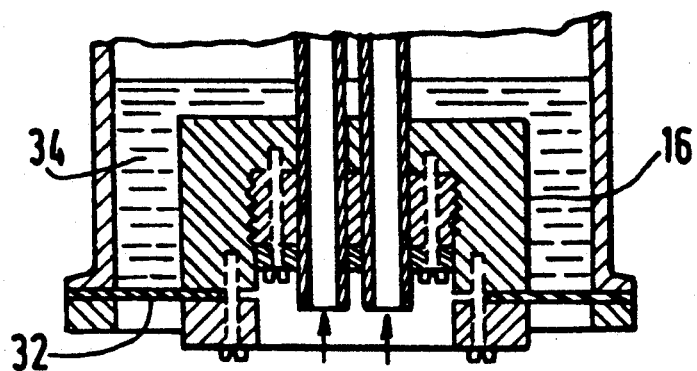
FIG. 3 shows a modified embodiment of the means of fastening the lower ends of the filtering tubes.

The same result is obtained with the embodiment of FIG. 3, which differs from the one shown in FIG. 2 in that the lower member 16 is connected to the shell through a dimensionally stable disk 32. The dimensionally stable disk 32 may be, for example a metallic disk of inoxidizable steel. In fact, although at this level the barriers are rigidly attached to the shell, the difference in expansion between barriers and shell may be compensated for at their upper end.

The gaskets 24 and 26 should have good resistance to heat and to an across-the-membrane pressure on the order of $10^6$ Pa, and they should be able to withstand deformation of a few millimeters, for example, 10 mm. Typically, flexible metallic gaskets may be used, for example, the corrugated stainless-steel gasket manufactured by Nydegger, which, moreover, has corrugations on the order of a millimeter and thus is better able to accommodate torsion.

Tests run with the separation apparatus of the invention have demonstrated very satisfactory results.

In one test, a three-barrier module as shown in FIG. 1 was used. In the presence of a suspension of solid catalyst particle fines in a liquid, the module was subjected to cycles of temperature increases from 20° to 310° C. over 3 hours, then of decreases to 20° C. over 2 hours at the rate of two cycles daily for two weeks. No leakage could be detected. The filtrate 34 recovered inside the shell 12 contained less than 10 ppm of particle fines.

As has been discussed herein, the principle of barriers which are attached to one another and joined by means of refractory cement to the floating members while the latter are attached to the shell through flexible gaskets is generally applicable to any assembly of tubes made of any material. For example, the assembly may be of glass or metal, and the inventive apparatus may be used for applications other than those particularly described herein.

I claim:

1. An apparatus comprising a plurality of tubes made of a first material, a shell body made of a second material which second material undergoes differential thermal expansion in relation to the first material of the tubes, two end members each being rigidly secured to a respective end of each of said tubes, at least one of the end members being a floating member, at least one flexible ring gasket having inner and outer edges which are affixed to the floating member and to the shell body, respectively.

2. The apparatus as defined in claim 1, wherein the two end members are floating members and are each connected to the shell by means of two respective flexible ring gaskets.

3. The apparatus as defined in claim 1, wherein one of the end members is floating and is connected to the shell by means of a flexible ring gasket and wherein the other end member is connected to the shell by means of a dimensionally stable disk.

4. The apparatus as defined in claim 1, wherein each end member is shaped as a disk or hollow cup having a bottom traversed by said tubes, and wherein the tubes are held in place by a packing material, which packing material is poured cold into the members and which packing material is capable of hardening.

5. The apparatus as defined in claim 4, wherein the packing material is compacted within the cup of end member and around the tubes passing therethrough by means of a cover disk which disk is fastened with bolts onto the end members.

6. The apparatus as defined in claim 1, wherein the plurality of tubes are parallel to and spaced from one another, each end of which tubes pass through respective holes in said end members.

7. The apparatus as defined in claim 1, wherein said tubes further comprise filter barriers.

8. The apparatus as defined in claim 1, wherein the flexible ring gaskets are made of metal.

9. The apparatus as defined in claim 8, wherein the flexible gaskets are made of stainless steel.

10. The apparatus as defined in claim 9, wherein the flexible stainless-steel gaskets are corrugated.

11. The apparatus as defined in claim 10, wherein the plurality of tubes are parallel to and spaced from one another, each end of which tubes pass through respective holes in said end members, and wherein each end member is shaped as a disk or hollow cup having a bottom traversed by said tubes, and wherein the tubes are held in place by a packing material, which packing material is poured cold into the members and which packing material is capable of hardening.

12. The apparatus as defined in claim 11, wherein said tubes further comprise ultrafiltration barriers coated With a mineral layer of at least one metal oxide.

13. The apparatus as defined in claim 12, wherein said packing material is a refractory material.

14. The apparatus as defined in claim 11, wherein the two end members are floating members and are each connected to the shell by means of two respective flexible ring gaskets.

15. The apparatus as defined in claim 11, wherein one of the end members is floating and is connected to the shell by means of a flexible ring gasket and wherein the other end member is connected to the shell by means of a dimensionally stable disk.

* * * * *